(12) United States Patent
Yun et al.

(10) Patent No.: US 12,278,377 B2
(45) Date of Patent: Apr. 15, 2025

(54) LITHIUM FREE BATTERY AND METHOD FOR PREPARING THE SAME

(71) Applicant: LG Energy Solution, LTD., Seoul (KR)

(72) Inventors: Hyunwoong Yun, Daejeon (KR); Jung Pil Lee, Daejeon (KR); Hoejin Hah, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 85 days.

(21) Appl. No.: 17/768,436

(22) PCT Filed: May 7, 2021

(86) PCT No.: PCT/KR2021/005753
§ 371 (c)(1),
(2) Date: Apr. 12, 2022

(87) PCT Pub. No.: WO2021/225415
PCT Pub. Date: Nov. 11, 2021

(65) Prior Publication Data
US 2024/0120495 A1    Apr. 11, 2024

(30) Foreign Application Priority Data

May 8, 2020   (KR) .................. 10-2020-0055157
Jan. 21, 2021  (KR) .................. 10-2021-0008511

(51) Int. Cl.
| | |
|---|---|
| H01M 4/66 | (2006.01) |
| H01M 4/13 | (2010.01) |
| H01M 4/139 | (2010.01) |
| H01M 10/058 | (2010.01) |
| H01M 4/02 | (2006.01) |

(52) U.S. Cl.
CPC ............ *H01M 4/66* (2013.01); *H01M 4/13* (2013.01); *H01M 4/139* (2013.01); *H01M 10/058* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2010/0330401 A1* | 12/2010 | Oukassi | H01M 4/0445 429/50 |
| 2011/0129733 A1 | 6/2011 | Kim et al. | |
| 2016/0248122 A1 | 8/2016 | Hwang et al. | |
| 2018/0226633 A1 | 8/2018 | Fujiki et al. | |
| 2019/0214672 A1 | 7/2019 | Chang et al. | |
| 2020/0136193 A1 | 4/2020 | Minami | |
| 2020/0144599 A1 | 5/2020 | Lee et al. | |
| 2021/0098794 A1 | 4/2021 | Han et al. | |
| 2021/0104774 A1 | 4/2021 | Kamaya et al. | |
| 2021/0408522 A1 | 12/2021 | Fujiki et al. | |
| 2021/0408523 A1 | 12/2021 | Fujiki et al. | |

FOREIGN PATENT DOCUMENTS

| | | |
|---|---|---|
| CN | 101944637 A | 1/2011 |
| CN | 107534182 A | 1/2018 |
| JP | 2004-87402 A | 3/2004 |
| JP | 2010-080210 A | 4/2010 |
| JP | 2011-009221 A | 1/2011 |
| JP | 2017-195028 A | 10/2017 |
| JP | 2018-506827 A | 3/2018 |
| JP | 2019-149334 A | 9/2019 |
| JP | 2019-207755 A | 12/2019 |
| KR | 10-2003-0023818 A | 3/2003 |
| KR | 10-2011-0001934 A | 1/2011 |
| KR | 10-2018-0091678 A | 8/2018 |
| KR | 10-2019-0083878 A | 7/2019 |
| KR | 10-2019-0097823 A | 8/2019 |
| KR | 10-2019-0143706 A | 12/2019 |
| KR | 10-2021-0136830 A | 11/2021 |
| WO | 2019/003641 A1 | 1/2019 |
| WO | 2019/151376 A1 | 8/2019 |

OTHER PUBLICATIONS

Cheol-Min Park et al., "Li-alloy based anode materials for Li secondary batteries", Chem. Soc. Rev. (2010) 39, 3115-3141.
Bifa Ji, et al., "A Novel and Generalized Lithium-Ion-Battery Configuration utilizing Al Foil as Both Anode and Current Collector for Enhanced Energy Density", Adv Mater., vol. 29, No. 7 (Dec. 12, 2016).

* cited by examiner

*Primary Examiner* — Wyatt P McConnell
(74) *Attorney, Agent, or Firm* — Bryan Cave Leighton Paisner LLP

(57) ABSTRACT

A lithium free battery comprising a positive electrode, a negative electrode, a separator, and a non-aqueous lithium electrolyte, wherein the negative electrode includes a metal substrate including at least one metal selected from the group consisting of Mg, Ca, Al, Si, Ge, Sn, Pb, As, Sb, Bi, Ag, Zn, Cd, P and Hg; a lithium-metal alloy layer formed on the metal substrate; and a lithium plating layer formed on the lithium-metal alloy layer, and a method for preparing the same.

8 Claims, No Drawings

LITHIUM FREE BATTERY AND METHOD FOR PREPARING THE SAME

CROSS CITATION WITH RELATED APPLICATION(S)

This application is a National Stage Application of International Application No. PCT/KR2021/005753, filed on May 7, 2021, which claims priority to Korean Patent Application No. 10-2020-0055157 filed on May 8, 2020 and Korean Patent Application No. 10-2021-0008511 filed on Jan. 21, 2021 with the Korean Intellectual Property Office, the disclosures of which are incorporated herein by reference in their entirety.

FIELD

The present disclosure relates to a lithium free battery and a method for preparing the same.

BACKGROUND

Due to the rapid increase in the use of fossil fuels, the demand for the use of alternative energy or clean energy is increasing, and as a part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and operating potential, has a long cycle life, and a low self-discharge rate, and has been commercialized and widely used.

In general, a lithium secondary battery has a structure in which a non-aqueous electrolyte solution is impregnated into an electrode assembly including a positive electrode, a negative electrode, and a porous separator. Further, the positive electrode is generally prepared by coating a positive electrode mixture including a positive electrode active material onto aluminum foil, and the negative electrode is prepared by coating a negative electrode mixture including a negative electrode active material onto a copper foil.

Usually, the positive electrode active material uses a lithium transition metal oxide, and the negative active material uses a carbon-based material.

However, recently, as a negative electrode active material, a lithium metal battery using lithium metal itself has been commercialized. Furthermore, lithium free batteries, in which only a current collector is used as a negative electrode in the preparation of electrodes, lithium is provided from the positive electrode by charging, and lithium metal is used as the negative electrode active material, are being actively studied. The lithium free batteries are considered as a battery concept that can achieve the highest energy density from the viewpoint of high energy density.

However, in the above-mentioned negative electrode, a lithium plating layer is formed on the current collector by electrodeposition due to charging. At this time, a lithium plating layer having a low electrodeposition density is formed on the current collector, and a side reaction of the electrolyte solution is severe, causing quick deterioration of lifetime characteristics.

Therefore, there is a need to develop a lithium free battery capable of solving the above problems and having an increased electrodeposition density of the lithium plating layer.

SUMMARY

Accordingly, the present disclosure has been made to solve the above-mentioned problems and other technical problems that have yet to be resolved.

Specifically, an object of the present disclosure is to provide a lithium free battery in which a lithium plating layer having a high electrodeposition density can be formed on the negative electrode by a simpler method.

Another object of the present disclosure is to prevent a side reaction of a lithium free battery, thereby improving the lifetime characteristics.

In order to achieve the above object, according to one embodiment of the present disclosure, there is provided a lithium free battery comprising a positive electrode, a negative electrode, a separator, and a non-aqueous lithium electrolyte, wherein the negative electrode comprises a metal substrate including at least one metal selected from the group consisting of Mg, Ca, Al, Si, Ge, Sn, Pb, As, Sb, Bi, Ag, Zn, Cd, P and Hg, a lithium-metal alloy layer formed on the metal substrate; and a lithium plating layer formed on the lithium-metal alloy layer, wherein the metal contained in the lithium-metal alloy layer is a metal contained in the metal substrate.

The lithium-metal alloy layer and the lithium plating layer may be formed by charging the lithium free battery.

At this time, the capacity per unit area (mAh/cm$^2$) of the positive electrode may be larger than the capacity per unit area of the negative electrode.

The metal substrate may include at least one metal selected from the group consisting of Si, Ge, Sn, Sb, Mg, Bi, As, Pb, P and Zn.

The metal substrate may have a thickness of 3 μM to 100 μM.

The metal substrate may have a thickness of 10 μM to 80 μM.

The lithium-metal alloy layer and the lithium plating layer have a thickness of 0.1 μM or more, respectively.

According to one embodiment of the present disclosure, there is provided a method for preparing the lithium free battery, the method comprising the steps of: (a) preparing a positive electrode by forming a positive electrode mixture layer on at least one surface of a positive electrode current collector; (b) preparing a preliminary negative electrode composed of a metal substrate including at least one metal selected from the group consisting of Mg, Ca, Al, Si, Ge, Sn, Pb, As, Sb, Bi, Ag, Zn, Cd, P and Hg; (c) preparing an electrode assembly by disposing a separator between the positive electrode and the preliminary negative electrode; and (d) housing the electrode assembly and the non-aqueous lithium electrolyte in a battery case, sealing the battery case, and then subjecting a result of the sealing of the battery case to charging, wherein a capacity per unit area (mAh/cm$^2$) of the positive electrode is larger than a capacity per unit area of the negative electrode.

The metal substrate may include at least one metal selected from the group consisting of Si, Ge, Sn, Sb, Mg, Bi, As, Pb, P and Zn.

The metal substrate may have a thickness of 3 μM to 100 μM.

DETAILED DESCRIPTION

Hereinafter, the present disclosure will be described in more detail for promoting an understanding of the invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The term provided herein is merely used for the purpose of describing particular embodiments, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

According to one embodiment of the present disclosure, there is provided a lithium free battery comprising a positive electrode, a negative electrode, a separator, and a non-aqueous lithium electrolyte, wherein the negative electrode comprises a metal substrate including at least one metal selected from the group consisting of Mg, Ca, Al, Si, Ge, Sn, Pb, As, Sb, Bi, Ag, Zn, Cd, P and Hg, a lithium-metal alloy layer formed on the metal substrate; and a lithium plating layer formed on the lithium-metal alloy layer, wherein the metal contained in the lithium-metal alloy layer is a metal contained in the metal substrate. At this time, the metal substrate may include at least one metal selected from the group consisting of Mg, Ca, Al, Si, Ge, Sn, Pb, As, Sb, Bi, Ag, Zn, Cd, P and Hg.

For such a lithium free battery, it is important to ultimately increase the electrodeposition density of the lithium plating layer. Increasing the electrodeposition density reduces a specific surface area and thus, minimizes a side reaction of the electrolyte solution, which can improve the lifetime characteristics of the lithium free battery Specifically, the negative electrode of the present disclosure is a form in which a preliminary negative electrode is prepared using the metal substrate, which is used to prepare a lithium free battery, and then subjected to charging to form a lithium-metal alloy layer and a lithium plating layer, which is used as a negative electrode. Therefore, the lithium-metal alloy layer and the lithium plating layer may be formed by charging the lithium free battery.

When a battery is prepared using a preliminary negative electrode made of a metal substrate and subjected to charging, Li ions transferred from the positive electrode through the non-aqueous lithium electrolyte chemically react with the metal substrate to form a lithium-metal alloy layer on the metal substrate.

Therefore, the metal substrate should be a metal substrate capable of forming an alloy with lithium, and the materials as described above can be used.

On the other hand, the higher the degree of alloying with lithium, more specifically, the higher the volumetric energy density of the metal, the more it reacts with lithium relative to the same volume to form more alloy layers. In such a case, the electrodeposition density of the lithium plating layer formed thereafter can be further increased.

Therefore, among the metal substrates, it is more preferable to formed of a material that has a higher volumetric energy density and forms more lithium alloy layers. In detail, the metal substrate may include at least one metal selected from the group consisting of Si, Ge, Sn, Sb, Mg, Bi, As, Pb, P and Zn. In this case, the metal substrate may be formed of at least one metal selected from the group consisting of Si, Ge, Sn, Sb, Mg, Bi, As, Pb, P, and Zn. Such a metal may correspond to a material having a better degree of lithium alloy than Al, that is, a high volumetric energy density.

On the other hand, since the reaction area of the metal substrate is fixed, a lithium-metal alloy layer is formed up to a predetermined portion during charging, and the capacity per unit area (mAh/cm$^2$) of the positive electrode is larger than the capacity per unit area of the negative electrode. Thus, during subsequent charging, the alloying reaction between lithium and metal does not proceed any further, and a lithium plating layer is formed on the lithium-metal alloy layer, and lithium on this lithium-metal alloy layer and lithium in the lithium plating layer are used as a negative electrode active material.

That is, for the negative electrode, a battery is prepared using a metal substrate, and then lithium, which is accepted by charging, is used as an active material. Thus, in order to increase the capacity of the lithium free battery, it is essential to enhance the capacity of the positive electrode to form not only a lithium-metal alloy layer but also a lithium plating layer, which is possible by increasing the amount of lithium used as the negative electrode active material.

On the other hand, conventionally, the lithium plating layer has a low electrodeposition density and thus, has a problem such as a side reaction of the electrolyte solution, and there is a big limitation in its use. However, according to the present disclosure, the lithium-metal alloy layer can be formed between the lithium plating layer and the metal substrate, thereby increasing the electrodeposition density of the lithium plating layer. Therefore, the present disclosure can be configured such that the capacity per unit area (mAh/cm$^2$) of the positive electrode is larger than the capacity per unit area of the negative electrode, whereby the electrodeposition density of the lithium plating layer can be increased while improving the total capacity of the lithium free battery, thus improving the lifetime characteristics.

Here, the capacity per unit area of the positive electrode can be calculated by multiplying the actual expression capacity (mAh/g) of the positive electrode active material by the amount (g) of the active material, and dividing it by the area (cm$^2$) of the current collector.

In addition, the capacity per unit area of the negative electrode refers to the capacity expressed while lithium and metal are alloyed. The capacity per unit area of the negative electrode may be calculated based on the amount of the lithium-metal alloy layer that can be formed on the metal substrate.

The metal substrate may comprise metals as described above, wherein the term 'comprising' refer to containing the metal at a level of 100%, or alternatively containing other metals and oxides as unavoidable impurities at a level equal to or less than 5% by weight, 3% by weight, or further at a level equal to or less than 1% by weight.

The metal substrate may have a thickness of 3 μM to 100 μM, specifically 10 μM or more and 80 μM or less, and 10 μM or more and 60 μM or less. More specifically, the metal substrate may have a thickness of 30 μM or more and 60 μM or less.

When the metal substrate has an excessively thin thickness outside the above range, due to the alloying reaction with lithium, the thickness becomes too thin, causing the problem of reduced strength, the lithium-metal alloy layer is formed very thin, many lithium plating layers are formed, and the specific surface area of the lithium plating layer is increased, so that many side reactions of the electrolyte solution also occur and thus, the effect of the present disclosure cannot be achieved. On the contrary, when the metal substrate is too thick, the entire volume increases, so that the volumetric energy density decreases, which is not desirable in terms of the volume.

On the other hand, the negative electrode in the lithium free battery according to the present disclosure essentially comprises a lithium-metal alloy layer and a lithium plating layer, and is not particularly limited in its thickness, but each layer may have a thickness of at least 0.1 JIM or more, specifically 1 µM or more, and more specifically, 3 µM or more.

This is also related to the thickness of the metal substrate and is also due to the difference in capacity per unit area between the positive electrode and the negative electrode. Therefore, the thickness of each of the lithium-metal alloy layer and the lithium plating layer can vary depending on how the battery is constructed. Further, the thickness is also affected by the thickness of the metal substrate. When the thickness of the lithium-metal alloy layer is too thin outside the above range, the lithium plating layer, which is vulnerable to reaction with the electrolyte solution, becomes excessively thick, so that many by-products are formed, and the internal resistance of the cell rapidly increases, which is not preferable.

Further, when the lithium plating layer is too thin, the lithium-metal alloy layer becomes too thick, and the alloy is lost during discharging, so that the lithium-metal alloy layer and the metal substrate are collapsed. When recharging, the lithium-metal alloy is not thoroughly generated on the metal substrate, so the lithium plating layer is irregularly formed, and it is also difficult to increase the electrodeposition density, and so deterioration of lifetime may be accelerated, which is not preferable. Of course, in such a case, the battery capacity is also reduced, although the lithium free battery has an advantage in that the battery capacity is also reduced and the energy density is high, it also become difficult to maximize it.

On the other hand, according to another embodiment of the present disclosure, there is provided a method for preparing the lithium free battery, the method comprising the steps of: (a) preparing a positive electrode by forming a positive electrode mixture layer on at least one surface of a positive electrode current collector; (b) preparing a preliminary negative electrode composed of a metal substrate including at least one metal selected from the group consisting of Mg, Ca, Al, Si, Ge, Sn, Pb, As, Sb, Bi, Ag, Zn, Cd, P and Hg; (c) preparing an electrode assembly by disposing a separator between the positive electrode and the preliminary negative electrode; and (d) housing the electrode assembly and the non-aqueous lithium electrolyte in a battery case, sealing the battery case, and then subjecting a result of the sealing of the battery case to charging, wherein a capacity per unit area (mAh/cm$^2$) of the positive electrode is larger than a capacity per unit area of the negative electrode. At this time, the metal substrate may comprise at least one metal selected from the group consisting of Mg, Ca, Al, Si, Ge, Sn, Pb, As, Sb, Bi, Ag, Zn, Cd, P and Hg.

Here, as described above, the metal substrate may include, specifically, at least one metal selected from the group consisting of Si, Ge, Sn, Sb, Mg, Bi, As, Pb, P and Zn and may have a thickness of 3 µM to 100 µM. Here, the metal substrate may be made of at least one metal selected from the group consisting of Si, Ge, Sn, Sb, Mg, Bi, As, Pb, P, and Zn.

Other specific details are the same as described above.

That is, the lithium free battery according to the present disclosure is prepared by a process in which a metal substrate is used as a preliminary negative electrode, which is used to prepare an electrode assembly, and then the electrode assembly is housed in a battery case together with a non-aqueous lithium electrolyte, and the battery case is sealed and then subjected to charging, thereby forming a lithium-metal alloy layer and a lithium plating layer on the metal substrate. Further, as described above, in order to have such a structure, the capacity per unit area of the positive electrode may be set to be larger than the capacity per unit area of the negative electrode.

On the other hand, other components of the lithium-free battery will be described.

As described above, the positive electrode is prepared by forming a positive electrode mixture layer on at least one surface of the positive electrode current collector. Here, the positive electrode mixture layer includes a positive electrode active material, a binder, and a conductive material, and may optionally further include a filler.

The positive electrode current collector is not particularly limited as long as it has conductivity while not causing chemical changes in the battery, and for example, stainless steel, aluminum, nickel, titanium, fired carbon, or aluminum or stainless steel that is surface-treated with carbon, nickel, titanium, silver, or the like may be used. In addition, the positive electrode current collector may have a thickness of 3 µM to 500 µM, and can have fine irregularities formed on the surface of the current collector to increase the adhesion of the positive electrode active material. For example, it may be used in various forms such as films, sheets, foils, nets, porous bodies, foams, and nonwoven fabrics.

The positive electrode active material as the active material may be, for example, a layered compound such as lithium nickel oxide (LiNiO$_2$) or a compound substituted with one or more transition metals; lithium manganese oxides such as chemical formulae Li$_{1+x}$Mn$_{2-x}$O$_4$ (where x is 0 to 0.33), LiMnO$_3$, LiMn$_2$O$_3$, LiMnO$_2$; lithium copper oxide (Li$_2$CuO$_2$); vanadium oxides such as LiV$_3$O$_8$, LiFe$_3$O$_4$, V$_2$O$_5$, and Cu$_2$V$_2$O$_7$; a Ni-site type lithium nickel oxide represented by chemical formula LiNi$_{1-x}$M$_x$O$_2$ (where M=Co, Mn, Al, Cu, Fe, Mg, B or Ga, and x=0.01~0.3); lithium manganese composite oxide represented by chemical formulae LiMn$_{2-x}$M$_x$O$_2$ (where M=Co, Ni, Fe, Cr, Zn or Ta, and x=0.01 to 0.1) or Li$_2$Mn$_3$MO$_8$ (where M=Fe, Co, Ni, Cu or Zn); LiMn$_2$O$_4$ with a Li portion of the chemical formula substituted with an alkaline earth metal ion; a disulfide compound; Fe$_2$(MoO$_4$)$_3$, and the like, without being limited thereto, and materials known in the art can be used.

The binder is a component that assists in coupling of an active material, a conductive material, and the like, and in coupling of a current collector, and typically, may be added in an amount of 0.1 to 30% by weight, specifically 1 to 10% by weight, more specifically 1 to 5% by weight based on the total weight of the positive electrode mixture layer. An example of the binder may include polyvinylidene fluoride, polyvinylidene fluoride-hexafluoropropylene, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated EPDM, styrene-butadiene rubber, fluorine rubber, various copolymers, and the like.

The conductive material is generally added in an amount of 0.1 to 30% by weight, specifically 1 to 10% by weight, and more specifically 1 to 5% by weight, based on the total weight of the positive electrode mixture layer. The conductive material is not particularly limited as long as it has high conductivity without causing a chemical change in the battery, and for example, graphite such as natural graphite or artificial graphite; carbon blacks such as carbon black, acetylene black, ketjen black, channel black, furnace black, lamp black, or thermal black; conductive fibers such as carbon fiber or metal fiber; metal powders such as carbon fluoride powder, aluminum powder, or nickel powder; conductive whiskey such as zinc oxide or potassium titanate; conductive metal oxides such as titanium oxide; conductive materials such as polyphenylene derivatives may be used.

The filler is not particularly limited so long as it is a fibrous material that does not cause chemical changes in the corresponding battery, and for example, olefin-based polymers such as polyethylene or polypropylene; and fibrous materials such as glass fiber or carbon fiber are used.

The separator is an insulating thin film having high ion permeability and mechanical strength. The pore diameter of the separator is generally 0.01 to 10 μM, and the thickness is generally 5 to 300 μM. As such separator, for example, chemical resistant and hydrophobic olefin-based polymers such as polypropylene; sheets or non-woven fabrics made of glass fiber or polyethylene, and the like is used. When a solid electrolyte such as a polymer is used as the electrolyte, the solid electrolyte may also serve as a separator.

The non-aqueous lithium electrolyte generally includes a lithium salt and a non-aqueous solvent. As the non-aqueous solvent, a non-aqueous organic solvent, an organic solid electrolyte, an inorganic solid electrolyte, or the like is used, but is not limited thereto.

As examples of the non-aqueous electrolyte, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups, and the like.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

The lithium salt is a material that is readily soluble in the non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics, flame retardancy and the like, the non-aqueous electrolyte may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoro-ethylene carbonate (FEC), propene sultone (PRS), and the like.

The battery case is not limited as long as it has a structure capable of housing an electrode assembly, and may be a pouch-type battery, or a prismatic or cylindrical battery case made of a metal can, which is known in the art.

The charge may be a full charge, and then aging treatment is performed at high temperature and/or room temperature. Thus, a lithium-metal alloy layer and a lithium plating layer are formed on the metal substrate of the preliminary negative electrode.

Hereinafter, preferred examples of the present disclosure, comparative examples compared thereto, and test examples for evaluating them are described. However, it will be apparent to those skilled in the art that these examples are merely illustrative of the present disclosure, and various changes and modifications can be made within the scope and technical spirit of the present disclosure, and it goes without saying that such variations and modifications fall within the scope of the appended claims.

Example 1

The lithium transition metal oxide ($LiNi_{1/3}Co_{1/3}Mn_{1/3}O_2$) was used as a positive electrode active material, PVdF as a binder, and Super-P as a conductive material. The positive electrode active material: the binder: the conductive material were added in a weight ratio of 96:2:2 to NMP to produce an active material slurry, which was then coated onto an Al foil at 4 mAh/cm$^2$ per one side, dried in a dryer at 130° C. under an air atmosphere, and then rolled to prepare a positive electrode.

A Si foil having a thickness of 30 gill, a length of 40 mm, and a width of 60 mm was used as a preliminary negative electrode.

An SRS separator having a thickness of 20 μM was assembled on the positive electrode and the preliminary negative electrode using a stacking method, the assembled electrode was housed in an aluminum pouch-type battery case, a solution of fluorethylene carbonate (FEC) and ethylmethyl carbonate (EMC) in a volume ratio of 3:7 in which 1M LiFSI was dissolved was injected, and then the battery case was sealed to prepare a monocell.

Example 2

A lithium free battery was prepared in the same manner as in Example 1, except that a Si foil having a thickness of 60 μM was used as a preliminary negative electrode in Example 1.

Example 3

A lithium free battery was prepared in the same manner as in Example 1, except that a Sn foil having a thickness of 30 μM was used as a preliminary negative electrode in Example 1.

Example 4

A lithium free battery was prepared in the same manner as in Example 1, except that an Al foil having a thickness of 30 μM was used as a preliminary negative electrode in Example 1.

Comparative Example 1

A lithium free battery was prepared in the same manner as in Example 1, except that a Cu foil having a thickness of 30 μM was used as a preliminary negative electrode in Example 1.

Comparative Example 2

A lithium free battery was prepared in the same manner as in Example 1, except that a foil containing 10 wt. % of Si as a dopant in a Cu matrix having a thickness of 30 μM was used as a preliminary negative electrode in Example 1.

Comparative Example 3

A lithium free battery was prepared in the same manner as in Example 1, except that a foil obtained by plating Sn to a thickness of 1 μM on a Ni foil having a thickness of 30 μM by an electroless plating method was used as a preliminary negative electrode in Example 1.

Experimental Example 1

The load amounts of the positive electrode and the negative electrode used in Examples 1 to 4 and Comparative Examples 1 to 3 were measured as follows.

For the measurement of the load amount of the positive electrode, the positive electrodes prepared in Examples were punched to 1.6 cm$^2$ in a coin shape, and charging and discharging were carried out at a rate of 0.1 C using a Li metal electrode as a counter electrode to measure the discharge capacity. When the area of the positive electrode was divided from the measured discharge capacity, the load amount of the positive electrode could be calculated.

For the measurement of the load amount of the negative electrode, the negative electrodes prepared in Examples were punched to 1.6 cm$^2$ into a coin shape, and charging and discharging were carried out at a rate of 0.1 C using a Li metal electrode as a counter electrode to measure the discharge capacity based on the time until the lithium-metal was alloyed. When the area of the negative electrode was divided from the measured discharge capacity, the load amount of the negative electrode could be calculated.

The load amount of the positive electrode and the load amount of the negative electrode loading thus calculated are shown in Table 1 below.

TABLE 1

| | Capacity per unit area of positive electrode (mAh/cm$^2$) | Capacity per unit area of negative electrode (mAh/cm$^2$) |
|---|---|---|
| Example 1 | 4.01 | 2.21 |
| Example 2 | | 2.41 |
| Example 3 | | 1.53 |
| Example 4 | | 0.91 |
| Comparative Example 1 | | 0 |
| Comparative Example 2 | | 0.35 |
| Comparative Example 3 | | 0.15 |

Referring to Table 1, it can be confirmed that the capacity per unit area of the positive electrode is larger than the capacity per unit area of the negative electrode. It can be seen that the lithium free batteries prepared by applying such positive electrodes and negative electrodes are charged by the capacity per unit area of the positive electrode, a lithium-metal alloy layer is formed on the metal substrate by the capacity per unit area of the negative electrode, and a lithium plating layer is formed by the remaining capacity. In addition, in the case of copper, it can be seen that alloying with lithium is not performed.

Experimental Example 2

The lithium free batteries prepared in Examples 1 to 4 and Comparative Examples 1 to 3 were charged under the following conditions, and then the lithium free batteries were decomposed to calculate the thickness and electrodeposition density of the lithium plating layer formed on the negative electrode, and the results are shown in Table 3 below.

Charge: 0.2 C, CC/CV, 4.25V, 1/20 C cut-off

For the thickness of the lithium plating layer, the average of the thicknesses was obtained by selecting two arbitrary points, and the electrodeposition density of the lithium plating layer was digitalized by calculating the deposition mass and the deposition volume.

TABLE 3

| | Thickness of plate layer(um) | Electrodeposition density (g/cc) |
|---|---|---|
| Example 1 | 35 | 0.30 |
| Example 2 | 30 | 0.33 |
| Example 3 | 45 | 0.22 |
| Example 4 | 60 | 0.17 |
| Comparative Example 1 | 100 | 0.10 |
| Comparative Example 2 | 77 | 0.13 |
| Comparative Example 3 | 85 | 0.12 |

(Theoretical density of lithium metal: 0.54 g/cm$^3$)

Referring to Table 2, when the metals according to Examples 1 to 4 of the present disclosure are used, the thickness of the lithium plating layer is thin and the density is improved, confirming that the lithium plating layer is formed more densely. On the other hand, it is confirmed that Comparative Example 1 using Cu has almost no improvement in electrodeposition density, and that even when a metal as defined herein is included as a dopant (Comparative Example 2), or even when it is formed in a very thin range (Comparative Example 3), the result of sufficient improvement in electrodeposition density cannot be obtained. From this, in order to sufficiently increase the electrodeposition density of the lithium plating layer and thus improve the battery performance, it can be seen that an amount of metal capable of alloying a sufficient amount of lithium is required, and the metal should be formed as a whole to improve the electrodeposition density of the lithium plating layer over the entire area.

On the other hand, Example 4 using Al has a predetermined effect of improving the electrodeposition density, but the improvement effect is slighter than that of Si, Sn or the like in Examples 1 to 3.

Experimental Example 3

The lithium free batteries of Examples 1 to 4 and Comparative Examples 1 to 3 were charged and discharged at 0.2 C, and the one-time discharge capacity was measured. Charging and discharging were additionally carried out under the following conditions, and then, the 100-time discharge capacity retention relative to the one-time discharge capacity was calculated, and the results are shown in Table 3 below.

Charge: 0.2 C, CC/CV, 4.25V, 1/20 C cut-off
Discharge: 0.5 C, CC, 3.0 V, cut-off

TABLE 3

|  | One-time capacity (mAh) | 100-time capacity retention (%) |
|---|---|---|
| Example 1 | 61.9 | 97 |
| Example 2 | 62.3 | 99 |
| Example 3 | 61.5 | 93 |
| Example 4 | 61.3 | 90 |
| Comparative Example 1 | 60.9 | 50 |
| Comparative Example 2 | 61.0 | 65 |
| Comparative Example 3 | 61.2 | 60 |

Referring to Table 3, it is confirmed in the case of Examples 1 to 4 according to the present disclosure, the density of the lithium plating layer increases and lifetime characteristics are excellent, as compared with Comparative Examples 1 to 3 having a difference in metal type or composition. In particular, it is confirmed that Example 2, in which the thickness of the current collector is thick, exhibits the most excellent lifetime characteristics.

In addition, when examining Examples 1 to 4, it can be seen that even among the metal substrates, as the theoretical capacity of a material alloyed with lithium, such as Si or Sn is higher, it is more advantageous in lifetime.

It will be appreciated by those skilled in the art that various applications and modifications can be made without departing the sprit and scope of the invention based on the above description.

As described above, the lithium free battery according to an embodiment of the present disclosure uses a metal capable of alloying with lithium as the metal substrate, so that a lithium-metal alloy layer is formed by charging on this metal substrate, and the lithium plating layer is formed on the lithium-metal alloy layer, and thus, it is effective in increasing the electrodeposition density of the lithium plating layer, thereby minimizing side reactions with the electrolyte solution and improving the lifetime characteristics.

The invention claimed is:

1. A lithium free battery comprising a positive electrode, a negative electrode, a separator, and a non-aqueous lithium electrolyte,
   wherein the negative electrode comprises:
   a metal substrate including at least one metal selected from the group consisting of Mg, Ca, Al, Si, Ge, Sn, Pb, As, Sb, Bi, Ag, Zn, Cd, P and Hg;
   a lithium-metal alloy layer formed on the metal substrate; and
   a lithium plating layer formed on the lithium-metal alloy layer,
   wherein the metal contained in the lithium-metal alloy layer is a metal contained in the metal substrate, and
   wherein the metal substrate has a thickness of 3 μm to 100 μm.

2. The lithium free battery according to claim 1, wherein:
   the lithium-metal alloy layer and the lithium plating layer are formed by charging the lithium free battery.

3. The lithium free battery according to claim 2, wherein:
   a capacity per unit area in mAh/cm$^2$ of the positive electrode is larger than a capacity per unit area of the negative electrode.

4. The lithium free battery according to claim 1, wherein the metal substrate comprises at least one metal selected from the group consisting of Si, Ge, Sn, Sb, Mg, Bi, As, Pb, P and Zn.

5. The lithium free battery according to claim 1, wherein the metal substrate has a thickness of 10 μm to 80 μm.

6. The lithium free battery according to claim 1, wherein the lithium-metal alloy layer and the lithium plating layer have a thickness of 0.1 μm or more, respectively.

7. A method for preparing the lithium free battery of claim 1, the method comprising:
   preparing a positive electrode by forming a positive electrode mixture layer on at least one surface of a positive electrode current collector;
   preparing a preliminary negative electrode composed of a metal substrate including at least one metal selected from the group consisting of Mg, Ca, Al, Si, Ge, Sn, Pb, As, Sb, Bi, Ag, Zn, Cd, P and Hg;
   preparing an electrode assembly by disposing a separator between the positive electrode and the preliminary negative electrode; and
   housing the electrode assembly and the non-aqueous lithium electrolyte in a battery case, sealing the battery case, and then subjecting a result of the sealing of the battery case to charging,
   wherein a capacity per unit area in mAh/cm$^2$ of the positive electrode is larger than a capacity per unit area of the negative electrode, and
   wherein the metal substrate has a thickness of 3 μm to 100 μm.

8. The method according to claim 7, wherein the metal substrate comprises at least one metal selected from the group consisting of Si, Ge, Sn, Sb, Mg, Bi, As, Pb, P and Zn.

* * * * *